United States Patent [19]

Hamada et al.

[11] Patent Number: 5,056,763
[45] Date of Patent: Oct. 15, 1991

[54] DYNAMIC DAMPER

[75] Inventors: Masaaki Hamada, Komaki; Masaaki Mishima, Kasugai, both of Japan

[73] Assignee: Tokai Rubber Industries, Ltd., Komaki, Japan

[21] Appl. No.: 398,392

[22] Filed: Aug. 25, 1989

[30] Foreign Application Priority Data

| Aug. 27, 1988 | [JP] | Japan | 63-213289 |
| Dec. 2, 1988 | [JP] | Japan | 63-306303 |
| Dec. 2, 1988 | [JP] | Japan | 63-306304 |

[51] Int. Cl.$^5$ ............................................. F16 7/00
[52] U.S. Cl. .................................. 267/141; 267/141.2;
188/379; 464/180; 74/604
[58] Field of Search ............... 188/378, 379; 267/141,
267/141.2, 293, 281; 464/180, 83; 74/604;
180/381; 123/192 R, 195 A; 384/125; 295/36.1;
248/559

[56] References Cited

U.S. PATENT DOCUMENTS

| 1,934,597 | 11/1933 | Föppl | 74/6 |
| 3,243,008 | 3/1966 | Muller | 180/381 X |
| 3,771,846 | 11/1973 | Bass et al. | 384/125 |
| 4,158,407 | 6/1979 | Rest | 295/36.1 X |
| 4,223,565 | 9/1980 | Sugiyama | 74/574 |
| 4,790,672 | 12/1988 | Komplin | 384/125 |
| 4,889,328 | 12/1989 | Uno et al. | 267/141.2 X |

FOREIGN PATENT DOCUMENTS

| 1109041 | 6/1961 | Fed. Rep. of Germany | 180/381 |
| 2840485 | 3/1980 | Fed. Rep. of Germany | |
| 3841054 | 6/1989 | Fed. Rep. of Germany | 248/559 |
| 62-124335 | 6/1987 | Japan | |
| 1040109 | 8/1966 | United Kingdom | 384/125 |
| 2100832 | 1/1983 | United Kingdom | |

*Primary Examiner*—Robert J. Obertleitner
*Assistant Examiner*—Lee W. Young
*Attorney, Agent, or Firm*—Berman & Aisenberg

[57] ABSTRACT

A dynamic damper of this invention comprises: a pair of ring-shaped fixing members disposed at a predetermined interval, inserted onto and supported by a rotary shaft; a cylinder-shaped mass member having inner surface larger than the outer surface of the rotary shaft, the cylinder-shaped mass member inserted onto the rotary shaft and disposed between the pair of ring-shaped fixing members; and elastic members integrally connecting the ends of the fixing members with the ends of the cylinder-shaped mass member. The dynamic damper has enabled to down-size the configuration thereof while maintaining the performance thereof and to make the installation thereof easier.

8 Claims, 12 Drawing Sheets

DYNAMIC DAMPER

BACKGROUND OF THE INVENTION

1. Field of the Invention

This invention relates to a dynamic damper installed around a rotary shaft, such as a drive shaft of an automobile. The dynamic damper is for suppressing harmful vibrations occurred in the rotary shaft.

2. Description of the Prior Art

When a rotary shaft, such as a drive shaft and a propeller shaft of an automobile and the like, rotates, unbalanced rotations occur. As a result of the unbalanced rotations, there occurs harmful vibrations like bending vibrations and torsional vibrations. It is preferred that the harmful vibrations should not occur at all. However, dynamic dampers have been widely used to suppress the harmful vibrations. The dynamic dampers work in the following manner: The dynamic dampers adjust their intrinsic frequencies to the dominant frequencies of the excited harmful vibrations, convert the vibration energy of the rotary shaft to the vibration energy of the dynamic dampers by resonance, and absorbs the vibration energy of the rotary shaft.

A conventional dynamic damper as illustrated in FIG. 20 has been used for a drive shaft of an automobile and the like. The dynamic damper 600 comprises a fixing member 601 inserted onto and supported by a drive shaft "S", a cylinder-shaped mass member 602 disposed around the outer periphery of the fixing member 601, and an elastic member 603 disposed between the fixing member 601 and the mass member 602 and connecting the fixing member 601 and the mass member 602. The intrinsic frequency of this dynamic damper 600 is fundamentally determined by the mass of the mass member 602 and the spring constant of the elastic member 603. The elastic member 603 is subjected to loads in the compression/tensile direction with respect to the vibration of the mass member 602. As a result, the elastic member 603 supports the mass member 602 in the direction exhibiting the compression/tensile spring constant.

However, the above-mentioned dynamic damper 600 has a structure, in which the mass member 602, the fixing member 601 inserted onto and supported by the drive shaft "S" and the elastic member 603 disposed between the fixing member 601 and the mass member 602 and supporting the mass member 602 are laminated in the radial direction of the dynamic damper 600. Consequently, the outer diameter of the conventional dynamic damper 600 tends to be larger because of the laminated fixing member 601, elastic member 603 and mass member 602, and it is very hard to press-fit and install the conventional dynamic damper 600 around the drive shaft "S" because the outer periphery of the elastic member 603 is constrained by the mass member 602 made of metal.

Further, when the intrinsic frequency of the dynamic damper 600 should be set in a lower value, the spring constant of the elastic member 603 should be set in a smaller value, or the mass of the mass member 602 should be greater. The shape of the elastic member 603 should be longer in the vibration direction in order to set the spring constant thereof in a smaller value. This means that the outer diameter of the elastic member 602 should be made much greater, and that the mass of the mass member should be made greater in order to increase the mass of the mass member 602. Thus, when the intrinsic frequency of the dynamic damper 600 should be set in a smaller value, it is inevitable that the outer diameter of the dynamic damper 600 becomes larger. However, it is preferred to down-size dynamic dampers while maintaining the performances thereof, because the dynamic dampers are additional devices and the installation space of the dynamic dampers is limited. As described above, it is hard to down-size the conventional dynamic damper 600 while maintaining the performances thereof. Especially, when the intrinsic frequency of the conventional dynamic damper 600 should be lowered, the outer diameter of the dynamic damper 600 has increased adversely.

SUMMARY OF THE INVENTION

It is therefore an object of this invention to down-size the configuration of dynamic damper while maintaining the performance thereof and to make the installation thereof easier.

A dynamic damper of this invention comprises: a pair of ring-shaped fixing members disposed at a predetermined interval, inserted into and supported by a rotary shaft; a cylinder-shaped mass member having inner surface larger than the outer surface of the rotary shaft, the cylinder-shaped mass member inserted into the rotary shaft and disposed between the pair of ring-shaped fixing members; and elastic members integrally connecting the ends of the fixing members with the ends of the cylinder-shaped mass member.

The dynamic damper of this invention has the mass member and the pair of fixing members which are disposed in a state not overlapping in the radial direction of the rotary shaft. Further, a space of a predetermined width is formed between the mass member and the rotary shaft. Furthermore, the elastic members supporting the mass member connects the ends of the fixing members and the ends of the mass members. Namely, the dynamic damper of this invention has component members disposed in line in the axial direction of the rotary shaft. Accordingly, the dimension of the outer diameter of the dynamic damper approximately equals the dimension of the rotary shaft outer diameter increased only by the thickness of the mass member. The outer diameter of the dynamic damper has been thus decreased remarkably compared with the outer diameter of the conventional dynamic dampers. In addition, the elastic members support the mass member in the lateral direction with respect to the vibrations. The elastic members accordingly support the mass member in the shear direction, and the spring constant thereof is expressed in the shear spring constant. The shear spring constant depends on the configurations of substances, but the value of the shear spring constant is smaller than the compression/tensile spring constant by a factor of a fraction to one-several hundredths as illustrated in FIG. 19. FIG. 19 is a diagram illustrating the relationships between the form rate "S" and the ratio of the compression (tensile) spring constant to the shear spring constant corresponding to the form rate "S". As a result, the mass and the size, especially the outer diameter dimension of the dynamic damper, can be down-sized while maintaining the performances of the dynamic damper, because the spring constant can be set at a lower value in the dynamic damper of this invention.

In FIG. 19, the letter "S" denotes the form rate, and its values are expressed by the following formula:

S=(Pressure Applied Surface Area)/(Free Surface Area)

Even when the spring constant of elastic material constituting the elastic members is fixed, the shear spring constant can be made into an optimum value for the intrinsic frequency to be set by properly modifying the shapes of the elastic members.

Thus, the dynamic damper of this invention has enabled to down-size the shape thereof remarkably. Further, it is easier to install the dynamic damper of this invention around the rotary shaft than to install the conventional dynamic dampers around the rotary shaft, because no member constraining the outer periphery of the fixing member is provided. The work efficiency of the dynamic damper installation can be improved accordingly.

The fixing members are for fixing the dynamic damper of this invention around the rotary shaft. At least one slit may be formed in these fixing members. The slit is formed in a manner extending in the axial direction of the fixing members. The fixing members are consequently made to allow the rotary shaft of a remarkably enlarged diameter to be inserted thereinto by expanding the slit in the circumferential direction.

The mass member constituting the dynamic damper of this invention has a cylindrical shape whose inner surface is greater than the outer surface of the rotary shaft. When the rotary shaft, around which the dynamic damper is installed and fixed, does not have a uniform shaft diameter, the mass member comes to have an inner surface greater than the outer surface of the rotary shaft having the largest outer diameter. As a result, the dynamic damper of this invention comes to have the fixing members having an inner surface meeting the shaft diameter of the rotary shaft to be inserted at the installation position. The dynamic damper also comes to have the mass member having an inner surface greater than the largest shaft diameter of the entire inserting path of the rotary shaft. Whereby the installation of the dynamic damper around the rotary shaft having a uniform shaft diameter, and even around the rotary shaft having a smaller shaft diameter at the installation position and a larger shaft diameter at the other portions, can be done with ease by expanding the slit of the fixing members.

Further, a slit may be formed not only in the fixing members but also in the elastic members and the mass members. In the case of a mass member made of a rigid substance, it is necessary to form two or more of slits therein, thereby making the installation of the dynamic damper around the rotary shaft much easier. It is desirable that the slits of the fixing members, the elastic members and the mass member are interconnected with each other. It is also desirable to provide a connecting member for integrating the portions separated by the slits in order to compensate reduced mechanical strength due to the slits.

Furthermore, at least part of the inner surface of the mass member may preferably be in a form of an inclining surface sloping away from the central axis of the rotation thereof, and the dynamic damper may have at least a hole or a slit at the furthest portion from the central axis of the rotation thereof. The hole or the slit is preferably made to extend from the inclining surface to the outside of the dynamic damper.

Here, the inclining surface may be an inclining surface sloping away from the central axis of the rotation along the axial direction or an inclining surface sloping away from the central axis of the rotation along the circumferential direction. The inclining surface is not limited to an inclining surface having a linearly inclining rate. The inclining surface may at least have a shape sloping away from the central axis of the rotation. As far as one or more of the inclining surfaces are formed, it is not necessary to specifically limit the number of the inclining surfaces formed in the inner surface of the mass member. The inclining surface communicates with the hole or slit reaching the outside of the dynamic damper. In the dynamic damper having these arrangements, water, oil and the like, which have got into and accumulated in the space formed between the outer surface of the inserted rotary shaft and the mass member, are pressed against the inner surface of the mass member by the centrifugal force resulting from the rotation of the rotary shaft. The water, oil and the like are then forced out along the one or more of the inclining surfaces formed in the inner surface of the mass member in the direction getting away from the central axis of the rotation. As a result, the water, oil and the like accumulated in the dynamic damper are collected at the portion of the inclining surface furthest away from the central axis of the rotation. Because the hole or slit, reaching the outside of the dynamic damper, is formed at the portion, the water, oil and the like are expelled to the outside of the dynamic damper. Thus, the water, oil and the like accumulated in the dynamic damper have been expelled automatically to the outside of the dynamic damper by the centrifugal force generated in accordance with the rotation of the rotary shaft and the dynamic damper installed thereto.

In addition, it is preferable to provide projections on the inner surface of the mass member. The projections contact with the outer surface of the rotary shaft during the occurrence of excessive amplitudes. When contacting with the outer surface of the rotary shaft, the projections relieve the shock or the performance deterioration during the occurrence of excessive amplitudes.

BRIEF DESCRIPTION OF THE DRAWING

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENT OF THE INVENTION

Having generally described this invention, a further understanding can be obtained by reference to certain specific preferred embodiments which are provided herein for purposes of illustration only and are not intended to be limiting unless otherwise specified.

FIRST PREFERRED EMBODIMENT

Figure 2:
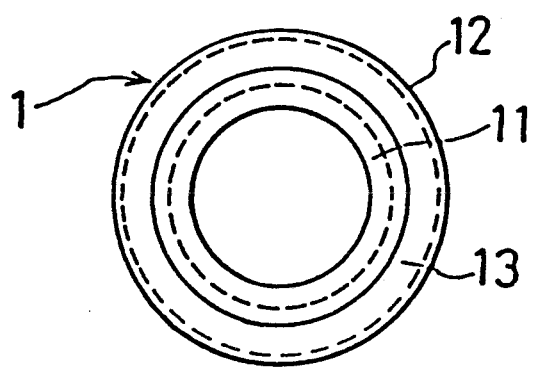
FIG. 2 is a right side elevation view of the dynamic damper thereof.
Figure 3:
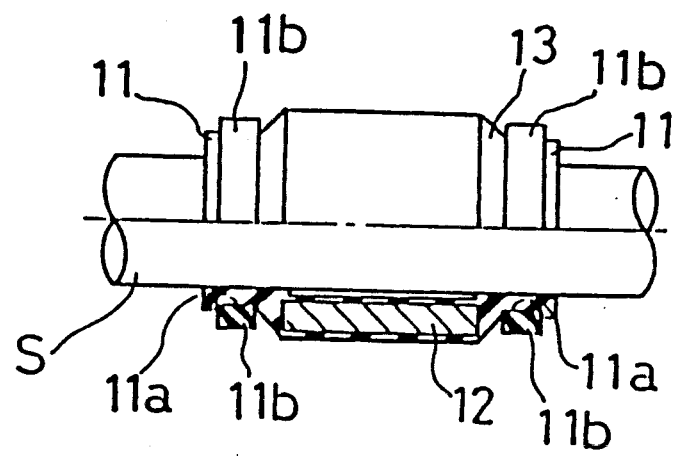
FIG. 3 is a front elevation view of the installed dynamic damper thereof, partially in section.

A dynamic damper of a first preferred embodiment according to this invention will be hereinafter described with reference to FIGS. 1 to 3.

Figure 1:
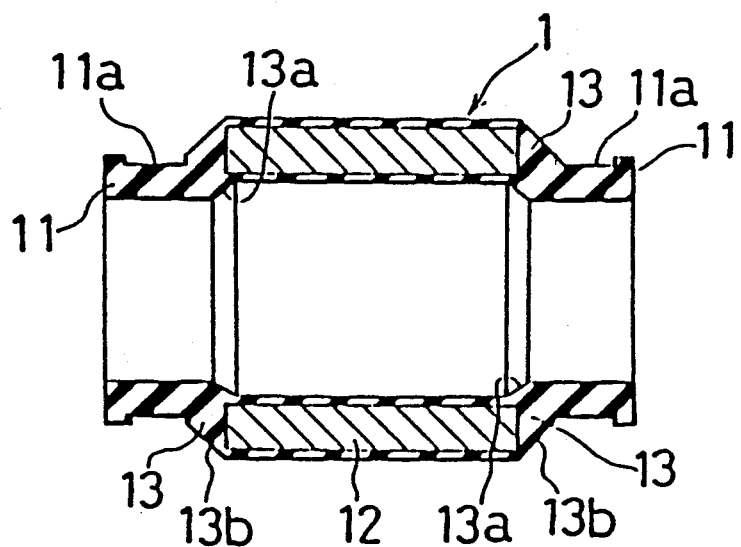
FIG. 1 is a vertical cross-sectional view of a dynamic damper of a first preferred embodiment, in which the dynamic damper is cut parallel to the axis thereof.

FIG. 1 is a vertical cross-sectional view of the dynamic damper of the first preferred embodiment, in which the dynamic damper is cut parallel to the axis thereof. FIG. 2 is a right side elevation view of the dynamic damper thereof. FIG. 3 is a front elevation view of the installed dynamic damper thereof, partially in section.

The dynamic damper 1 of this first preferred embodiment is employed for damping vibrations of automobile drive shafts. This dynamic damper 1 belongs to the type of dynamic dampers which is press-fitted and installed around drive shafts.

The dynamic damper 1 of this first preferred embodiment comprises: a pair of fixing members 11, 11 inserted onto and supported by a drive shaft "S" as a rotary shaft at a predetermined interval; a mass member 12 having an inner surface greater than the outer surface of the drive shaft "S" and disposed between the pair of the fixing members 11, 11; and elastic members 13, 13 integrally connecting the ends of the fixing members 11, 11 and the ends of the mass member 12. The dynamic damper 1 has a cylinder-shaped overall configuration, in which the outer diameter of the intermediate portion is greater than the outer diameters of both of the end portions. Here, the mass member 12 corresponds to the intermediate portion, and the fixing members 11, 11 correspond to both of the end portions. The elastic members 13, 13 correspond to portions connecting the intermediate portion and both of the end portions in an inclining manner.

The fixing members 11, 11 are formed in a ring shape, used in a pair, and formed of elastic material such as natural rubber and the like. The diameter of the inner surface of the ring-shaped fixing member 11, constituting the central axis bore thereof, is smaller than the diameter of the outer surface of the drive shaft "S" by approximately 1 mm. Further, a ring-shaped groove 11a is formed in the outer surface of the fixing member 11.

The mass member 12 is a cylinder-shaped mass body made of metal such as a thick-wall cylinder-shaped steel pipe, and the outer and inner surfaces are coated with elastic material such as natural rubber and the like by the thickness of approximately 1 mm. The mass member 12 is disposed around the outer circumference of the drive shaft "S". There is formed a clearance of approximately 1.5 mm between the inner surface of the mass member 12 and the outer surface of the drive shaft "S". The clearance works fully as far as the clearance falls in the range of approximately from 1 to 2 mm.

The elastic members 13, 13 are formed in a hollow truncated cone, and formed of elastic material such as natural rubber and the like. The elastic member 13, 13 connect the fixing members 11, 11 and the mass member 12 integrally. The inner surface 13a of the elastic member 13 is formed in a tapered shape, namely the inner surface 13a of the elastic member 13 starts at the inner surface end of the fixing member 11 to be brought into close contact with the outer surface of the drive shaft "S", and reaches the inner surface end of the mass member 12 having a clearance of 1.5 mm from the drive shaft "S" while gradually increasing the inner diameter thereof. The outer surface 13b of the elastic member 13 is formed also in a tapered shape, namely the outer surface 13b of the elastic member 13 starts at the end of the engaging groove 11a formed in the fixing member 11, and reaches the outer surface end of the mass member 12 while gradually increasing the outer diameter thereof.

Both of the fixing members 11, 11, both of the elastic members 13, 13 and the rubber coating of the mass member 12 are formed integrally by vulcanization molding with a mold.

The dynamic damper 1 of this first preferred embodiment arranged as described above is used in the following manner. When installing the dynamic damper 1 around the drive shaft "S", the opening of the fixing member 11 of the dynamic damper 1 is placed on the shaft end of the drive shaft "S" before mounting the drive shaft "S" on an automobile body. Because the diameter of the inner surface of the fixing member 11 is made smaller than the outer diameter of the drive shaft "S", the drive shaft "S" is press-fitted into the fixing member 11 while pressing and expanding the inner surface of the fixing member 11 formed of elastic material. After disposing the dynamic damper at a predetermined position of the drive shaft "S", the engaging grooves 11a, 11a formed in the fixing members 11, 11 are fixed by the fixing bands 11b, 11b made of stainless steel, whereby the dynamic damper 1 is installed around the drive shaft "S". The fixing belt 11b may be formed of materials other than stainless steel as far as the fixing bands 11b, 11b can firmly fix the dynamic damper 1 around the drive shaft "S".

When the drive shaft "S" rotates and harmful vibrations are excited, the mass member 12 of the dynamic damper 1 resonates. The intrinsic frequency of the mass member 12 has been adjusted to the frequencies of the harmful vibrations, and the adjustment of the intrinsic frequency is performed by varying the configurations of the elastic members 13, 13. The lengths of the elastic members 13, 13 greatly affect the intrinsic frequency. Here, the lengths of the elastic members 13, 13 mean the lengths from the portion where the elastic members 13, 13 take off the outer surface of the drive shaft "S" to the end of the thick-wall cylinder-shaped steel pipe constituting the mass member 12. The longer the lengths of the elastic members 13, 13 become, the smaller the shear spring constants of the elastic members 13, 13 decrease and the lower the intrinsic frequency of the dynamic damper 1 decreases. On the contrary, the smaller the lengths of the elastic members 13, 13 become, the higher the intrinsic frequency of the dynamic damper 1 increases. Thus, the dynamic damper 1 arranged as described above can absorb the vibration energy of the drive shaft "S" and suppress the harmful vibrations excited in the drive shaft "S" by resonating the mass member 12 thereof.

SECOND PREFERRED EMBODIMENT

Figure 4:
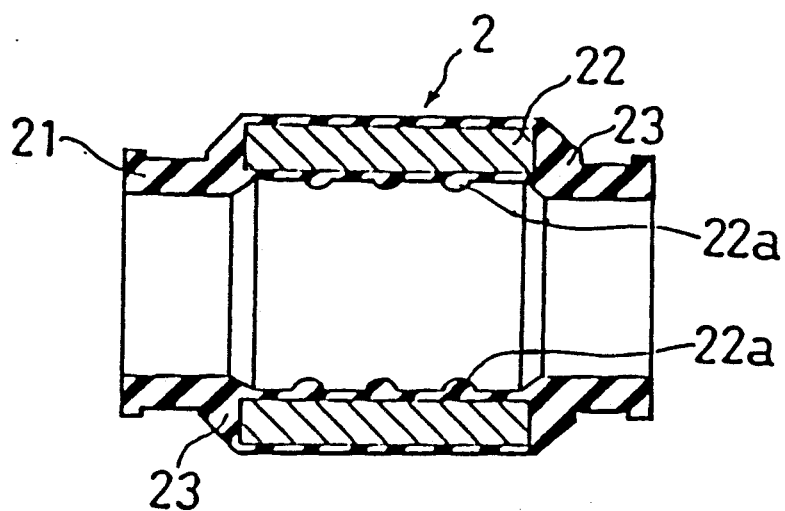
FIG. 4 is a vertical cross-sectional view of a dynamic damper of a second preferred embodiment, in which the dynamic damper is cut parallel to the axis thereof.

A dynamic damper of a second preferred embodiment according to this invention will be hereinafter described with reference to FIG. 4.

The dynamic damper 2 of this second preferred embodiment is employed for damping vibrations of automobile drive shafts. The following functions are added to the dynamic damper 1 of the first preferred embodiment: i.e., a shock relieving function for relieving shocks during the occurrence of excessive amplitudes, and an automatic adjustment function for suppressing the excessive amplitudes in a predetermined tolerance range.

The dynamic damper 2 of this second preferred embodiment has arrangements similar to those of the dynamic damper 1 of the first preferred embodiment, except that the mass member 22 thereof has a configuration different from that of the dynamic damper 1 of the first preferred embodiment.

The mass member 22 is a cylinder-shaped mass body made of metal such as a thick-wall cylinder-shaped steel pipe, and the outer and inner surfaces are coated with elastic material such as natural rubber and the like by the thickness of approximately 1 mm. Further, a plurality of projections 22a is formed on the inner surface. The projections 22a are virtually in a form of a cone shape. There is formed a clearance between the tops of the projections 22a and the outer surface of the drive shaft "S", and the clearance corresponds approximately to the maximum amplitude value of the mass member 22 in the operation range of the dynamic damper 2. Moreover, the projections 22a have a non-linear spring constant. The non-linear spring constant means that, when the projections 22a are compressed at the tops, the less the compression amount becomes, the smaller the spring constant value decreases, and the larger the compression amount becomes, the greater the spring constant value increases.

As for the other members, such as the fixing members 21, 21 and the elastic members 23, 23 have similar arrangements as those of the dynamic damper 1 of the first preferred embodiment.

The additional functions provided by forming the projections 22a will be hereinafter described.

When the magnitude of the vibrations exerted by the drive shaft "S" falls in the operation range of the dynamic damper 2, the projections 22a and the outer surface of the drive shaft "S" do not contact. The dynamic damper 2 operates in a manner similar to the operation of the dynamic damper 1 of the first preferred embodiment.

When the mass member 22 responds excessively to the vibrations exerted by the drive shaft "S", the projections 22a of the mass member 22 are brought into contact with or compressed against the drive shaft "S", thereby absorbing and relieving the shocks during the collision. When the excessive vibrations are input continuously in a certain period of time, the mass member 22 of the dynamic damper 2 vibrates while compressing the projections 22a periodically. The intrinsic frequency of the dynamic damper 2 is determined basically by the mass of the mass member 22 and the spring constant supporting the mass in the vibration directions. In this second preferred embodiment, the mass of the mass member 22 is constant, but the spring constant depends on the amplitude values of the mass member 22. When the mass member 22 vibrates in an appropriate amplitude range, namely, when the mass member 22 vibrates without bringing the projections 22a into contact with the drive shaft "S", the spring constant is virtually fixed. However, when the amplitude of the mass member 22 becomes excessive, and the projections 22a are brought into contact with and compressed by the drive shaft "S", the spring constant is the sum of the shear spring constants of the elastic members 23, 23 and the non-linear compression spring constants of the projections 22a. When the projections 22a are in the range where they do not contact with the drive shaft "S", the intrinsic frequency of the dynamic damper 2 is identical with that of the vibration excited in the drive shaft "S". However, when the projections 22a are brought into contact with and compressed by the drive shaft "S", the intrinsic frequency of the dynamic damper 2 increases because the larger the compression amount becomes, the greater the spring constants of the projections 22a increase. In this case, the intrinsic frequency of the dynamic damper 2 differs from the frequency of the vibration excited in the drive shaft "S", and the response amplitude amount decreases. As a result, the compression amount of the projections 22a decreases, and the intrinsic frequency approaches the original value. The steady-state response having a constant response amplitude has been achieved accordingly by way of the transient response.

In this way, the dynamic damper 2 of this second preferred embodiment comes to have the function for automatically adjusting the excessive amplitudes to an appropriate response amplitude when the excessive vibrations are input. The vibration suppressing performance of the dynamic damper 2 has deteriorated more or less when performing the function, but the dynamic damper 2 can work as a dynamic damper over a wide range of input vibrations, thereby avoiding the adverse influences to the drive shaft "S" and the dynamic damper 2.

The number of the projections 22a is determined by the magnitude of the response amplitude to be set and the stability. Further, the configuration of the projections 22a is not limited to the above mentioned cone shape as far as the projections 22a exhibit the abovementioned non-linear spring constant characteristic. Furthermore, the projections 22a may be formed in a stripe shape as a whole, or they may be formed in another shapes.

THIRD PREFERRED EMBODIMENT

Figure 7:
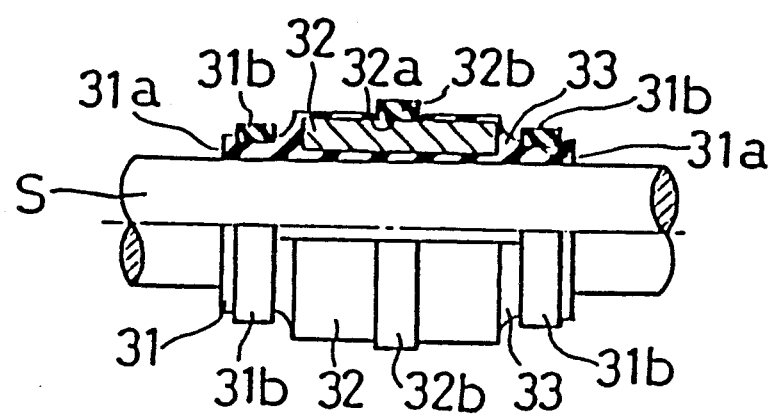
FIG. 7 is a front elevation view of the installed dynamic damper thereof, partially in section.

A dynamic damper of a third preferred embodiment according to this invention will be hereinafter described with reference to FIGS. 5 and 7.

Figure 5:
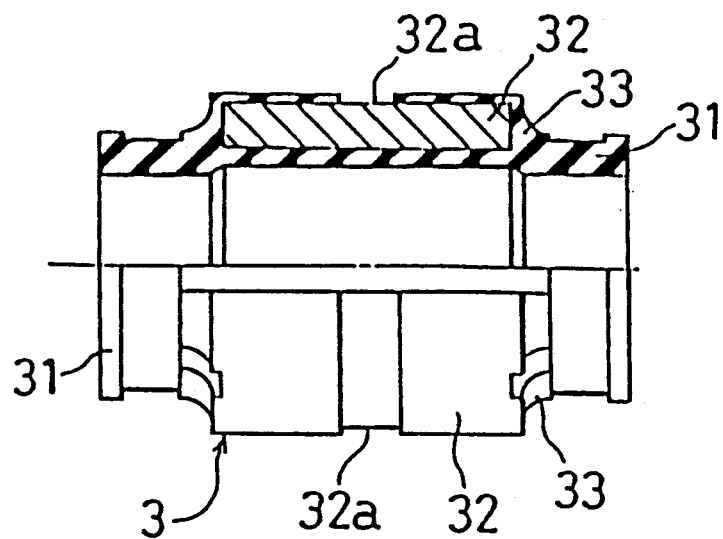
FIG. 5 is a front elevation view of a dynamic damper of a third preferred embodiment, in which half of the dynamic damper is cut away parallel to the axis thereof.
Figure 6:
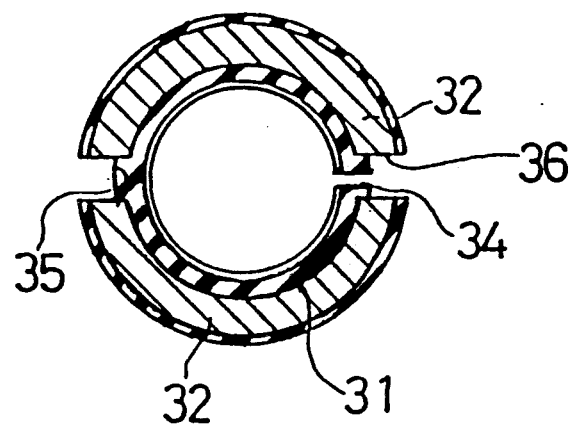
FIG. 6 is a cross-sectional view of the dynamic damper thereof, in which the dynamic damper is cut perpendicularly to the axis thereof.

FIG. 5 is a front elevation view of the dynamic damper of the third preferred embodiment, in which half of the dynamic damper is cut away parallelly to the installation axis. FIG. 6 is a cross-sectional view of the dynamic damper thereof, in which the dynamic damper is cut perpendicularly to the axis thereof. FIG. 7 is a front elevation view of the installed dynamic damper thereof, partially in section.

The dynamic damper 3 of this third preferred embodiment is employed for damping vibrations of automobile drive shafts, similarly to the dynamic dampers 1 and 2 of the first and second preferred embodiments. The dynamic damper 3 has an arrangement for enabling an easy installation around the drive shaft "S".

The dynamic damper 3 of this third preferred embodiment comprises fixing members 31, 31, a mass member 32, and elastic members 33, 33. The specific arrangements of the dynamic damper 3, which are different from those of the dynamic damper 1 of the first preferred embodiment, will be hereinafter described, because the dynamic damper 3 has basically the same arrangements as those of the dynamic damper 1.

The dynamic damper 3 of this third preferred embodiment has the structure of the dynamic damper 1 of the first preferred embodiment provided with a slit 34 extending parallelly to the axis of the dynamic damper 3. The cross-section of the dynamic damper 3 perpendicular to the axis is in a form of the letter "C" shape. A foldable groove-shaped folding portion 35 is formed at an axially symmetrical portion with respect to the slit 34 in a manner extending parallel to the axis of dynamic damper 3. In addition, ring-shaped engaging grooves 31a, 31a are formed in the outer surface of the fixing members 31, 31, and a ring-shaped engaging groove 32a is formed in the outer surface of the mass member 32. In these engaging grooves 31a, 31a and 32a, fixing bands 31b, 31b and 32b, being a connecting means for closing and connecting the slit 34 and made of stainless steel, are installed in order to fix the dynamic damper 3 around the drive shaft "S".

The mass member 32 forming part of the folding portion 35 is divided into several component members by predetermined spaces in the circumferential direction lest the mass member 32 would not hinder the folding. In the fixing member 31, a dent portion having a virtually letter "U" shape and constituting part of the folding portion 35 may be formed in the outer surface of the fixing member 31, thereby making the opening and closing operation of the dynamic damper much easier. Finger placing portions 36 are formed along the slit 34 on the portions of the mass member 32 constituting the slit 34, thereby making the manual opening and closing of the dynamic damper 3 easier.

The installation of the dynamic damper 3 of this third preferred embodiment is performed in the following manner: Fingers are placed on the finger placing portions 36 formed on the portions of the mass member 32 constituting the slit 34. The dynamic damper 3 is opened around the folding portion 35 as the center of the opening by spreading the dynamic damper 3 toward the outside. Then, the slit 34 of the dynamic damper 3 widely opened is placed at a predetermined installation position of the drive shaft "S", and the dynamic damper 3 is installed around the drive shaft "S". After closing the slit 34, the stainless steel fixing bands 31b, 31b and 32b as the connecting means are respectively installed around the engaging grooves 31a, 31a and 32a in order to fix the dynamic damper 3 around the drive shaft "S". The fixing belt 31b, 31b and 32b may be formed of materials other than stainless steel as far as the fixing bands 31b, 31b and 32b have a sufficient rigidity and can firmly fix the dynamic damper 3 around the drive shaft "S".

The operation of the dynamic damper 3 will not be described, because the dynamic damper 3 is hereinafter used and operable in the identical manner with that of the dynamic damper 1 of the first preferred embodiment. When dismounting the dynamic damper 3 from the drive shaft "S", the dismounting is done in the order reversing the above-mentioned order of the installation.

FOURTH PREFERRED EMBODIMENT

Figure 8:
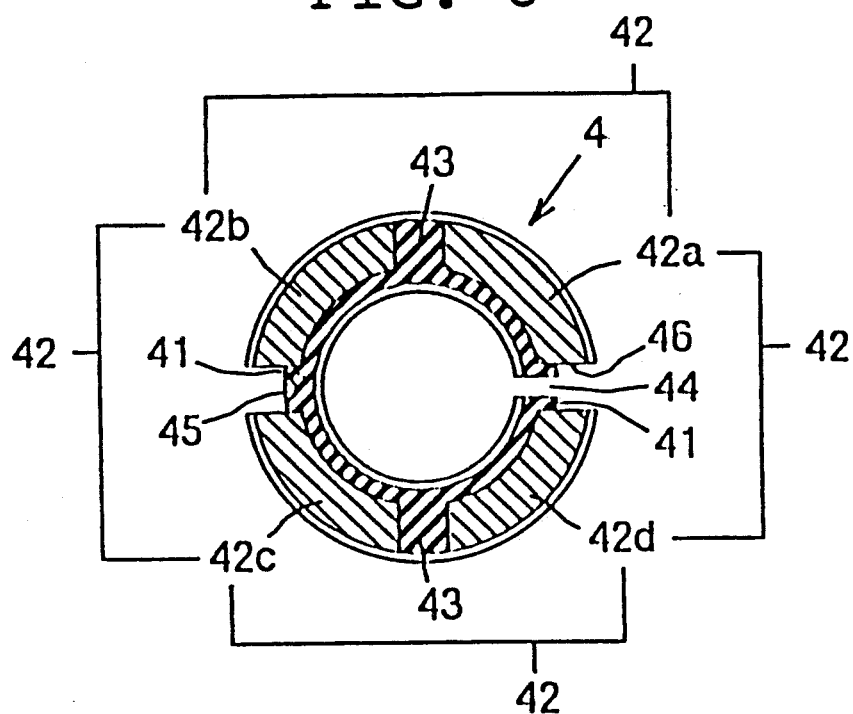
FIG. 8 is a cross-sectional view of a dynamic damper of a fourth preferred embodiment, in which the dynamic damper is cut perpendicularly to the axis thereof.

A dynamic damper of a fourth preferred embodiment according to this invention will be hereinafter described with reference to FIG. 8. FIG. 8 is a cross-sectional view of the dynamic damper of the fourth preferred embodiment, in which the dynamic damper is cut perpendicularly to the axis thereof.

The dynamic damper 4 of this preferred embodiment is also made for rendering the installation thereof around the drive shaft easier, similarly to the dynamic damper 3 of the third preferred embodiment. The dynamic damper 4 of this preferred embodiment has arrangements virtually similar to those of the dynamic damper 3 of the third preferred embodiment. However, in the dynamic damper 4 of this preferred embodiment, the mass member 42 is divided into four (4) component members in the circumferential direction, and the component members 42a, 42b, and 42c and 42d are disposed at predetermined spaces in the circumferential direction. A slit 44, extending parallelly to the axis of the dynamic damper 4, and finger placing portions 46 are formed in the groove-shaped space formed by the ends of the divided component members 42a and 42d of the mass member 42 and the fixing member 41. A foldable folding portion 45 is formed in the groove-shaped space, formed by the ends of the divided component members 42b and 42c of the mass member 42 and the fixing member 41, and disposed at an axially symmetrical portion with respect to the slit 44 in a manner extending parallelly to the axis of dynamic damper 4. In addition, the elastic member 43 integrally connects the portions at approximately 90 deg. with respect to the slit 44 and the folding portion 45 in the counterclockwise direction in FIG. 8, i.e., the portion between the other ends of the component members 42a and 42b of the mass member 42 and the portion between the other ends of the component members 42c and 42d thereof.

The dynamic damper 4 of this preferred embodiment is used in a manner substantially similar to that of the dynamic damper 3 of the third preferred embodiment. The dynamic damper 4 is also opened around the folding portion 45 as the center of the opening by spreading the dynamic damper 4 toward the outside. However, the opening operation of the dynamic damper 4 is easier than that of the dynamic damper 3 of the third preferred embodiment, because the portion between the other ends of the component members 42a and 42b of the mass member 42, disposed at approximately 90 deg. with respect to the slit 44 in the counterclockwise direction in FIG. 8, is integrally connected by the elastic member 43, and because the portion between the other ends of the component members 42c and 42d thereof, disposed at approximately 90 deg. with respect to the folding portion 45 in the counterclockwise direction in FIG. 8, is integrally connected by the elastic member 43. Because the elastic member 43 disposed between the other ends of the component members 42a and 42b and between the other ends of the component members 42c and 42d is compressed while opening the dynamic damper 4 of this preferred embodiment, the force required to open the dynamic damper 4 of this preferred embodiment is less than the force required to open the dynamic damper 3 of the third preferred embodiment. Thus, the dynamic damper 4 of this preferred embodiment can be opened by the less force as widely as the dynamic damper 3 of the third preferred embodiment is opened.

The description on the dynamic damper 4 other than the above description is identical with that of the dynamic damper 3 of the third preferred embodiment, and will be omitted.

FIFTH PREFERRED EMBODIMENT

Figure 9:
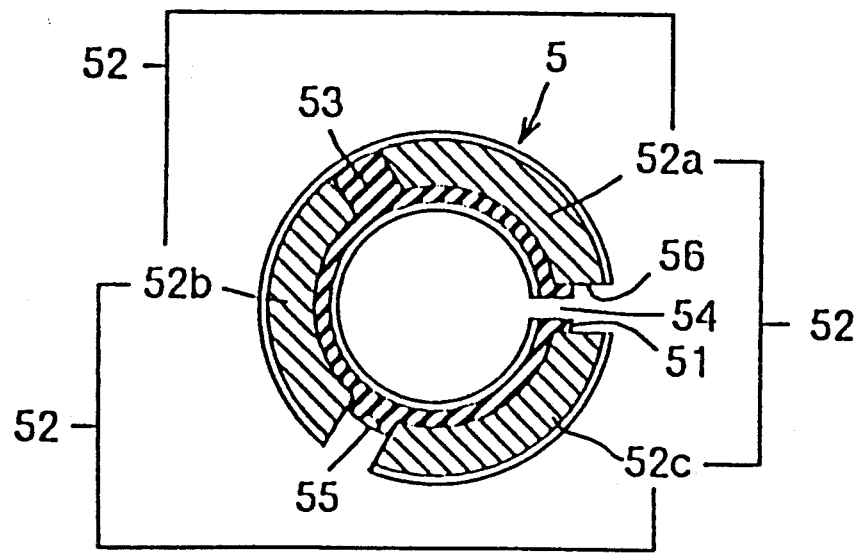
FIG. 9 is a cross-sectional view of a dynamic damper of a fifth preferred embodiment, in which the dynamic damper is cut perpendicularly to the axis thereof.

Next, a dynamic damper of a fifth preferred embodiment according to this invention will be hereinafter described with reference to FIG. 9. FIG. 9 is a cross-sectional view of the dynamic damper of the fifth preferred embodiment, in which the dynamic damper is cut perpendicularly to the axis thereof.

The dynamic damper 5 of this preferred embodiment is also made for rendering the installation thereof around the drive shaft easier, similarly to the dynamic damper 3 of the third preferred embodiment. The dynamic damper 5 of this preferred embodiment has arrangements virtually similar to those of the dynamic damper 3 of the third preferred embodiment. However, in the dynamic damper 5 of this preferred embodiment, the mass member 52 is divided into three (3) component members in the circumferential direction, and the component members 52a, 52b, and 52c, are disposed at predetermined spaces in the circumferential direction. A slit 54, extending parallelly to the axis of the dynamic damper 5, and finger placing portions 56 are formed in the groove-shaped space formed by the ends of the divided component members 52a and 52c of the mass member 52 and the fixing member 51. A foldable folding portion 55 is formed in the groove-shaped space, formed by the end of the divided members 52b, the other end of the divided component member 52c of the mass member 52 and the fixing member 51, and disposed at approximately 240 deg. with respect to the slit 54 in the counterclockwise direction in FIG. 9 in a manner extending parallelly to the axis of dynamic damper 5. In addition, the elastic member 53 integrally connects the portion at approximately 120 deg. with respect to the slit 54 in the counterclockwise direction in FIG. 9, i.e., the portion between the other ends of the component members 52a and 52b of the mass member 52.

The dynamic damper 5 of this preferred embodiment is used in a manner substantially similar to that of the dynamic damper 3 of the third preferred embodiment. The dynamic damper 5 is also opened around the folding portion 55 as the center of the opening by spreading the dynamic damper 5 toward the outside. However, the opening operation of the dynamic damper 5 is easier than that of the dynamic damper 3 of the third preferred embodiment, because the portion between the other ends of the component members 52a and 52b of the mass member 52, disposed at approximately 120 deg. with respect to the slit 54 in the counterclockwise direction in FIG. 9, is integrally connected by the elastic member 53. Because the elastic member 53 disposed between the other ends of the component members 52a and 52b is compressed while opening the dynamic damper 5 of this preferred embodiment, the force required to open the dynamic damper 5 of this preferred embodiment is less than the force required to open the dynamic damper 3 of the third preferred embodiment. Thus, the dynamic damper 5 of this preferred embodiment can be opened by the less force as widely as the dynamic damper 3 of the third preferred embodiment is opened. In addition, because the folding portion 56 is disposed close to and at approximately 240 deg. with respect to the slit 54 in the counterclockwise direction in FIG. 9 in the dynamic damper 5 of this preferred embodiment, the amount of work required for opening the dynamic damper 5 has been reduced and the opening operation of the dynamic damper 5 has been made much easier.

Further, the portion between the other ends of the component members 52a and 52b of the mass member 52, disposed at 120 deg. with respect to the slit 54 in the counterclockwise direction in FIG. 9, are connected by the elastic member 53 in the dynamic damper 5 of this preferred embodiment, but the component members 52a and 52b may be formed in an integral component member, not in separate component members, to make the mass member 52 dividable into 2 component members. When a dynamic damper according to this invention employs such arrangement, the dynamic damper effects advantages virtually similar to those described above.

The description on the dynamic damper 5 other than the above description is identical with that of the dynamic damper 3 of the third preferred embodiment, and will be omitted.

SIXTH PREFERRED EMBODIMENT

A dynamic damper of a sixth preferred embodiment according to this invention will be hereinafter described with reference to FIGS. 10 to 12.

Figure 10:
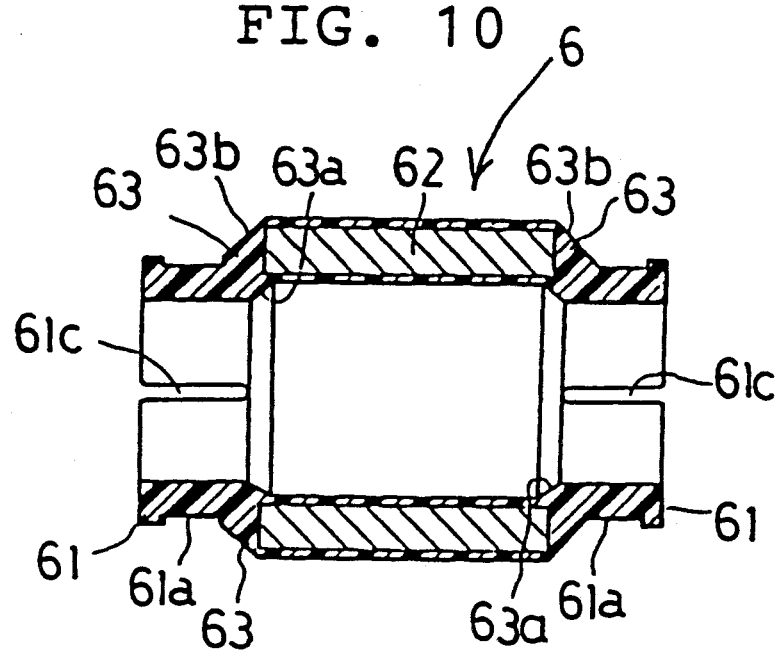
FIG. 10 is a cross-sectional view of a dynamic damper of a sixth preferred embodiment, taken on the line 10—10 of FIG. 11.
Figure 11:
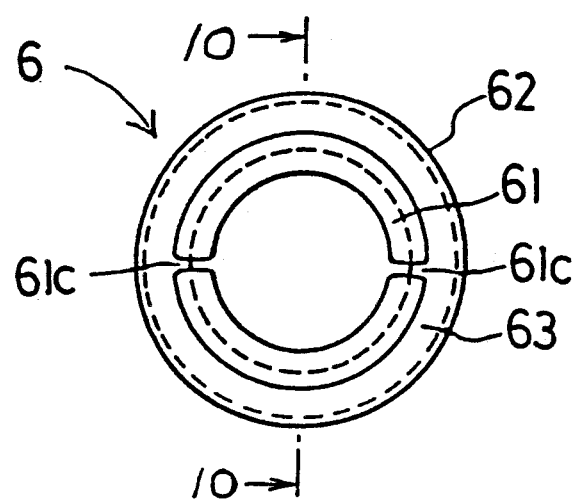
FIG. 11 is a right side elevation view of the dynamic damper thereof.
Figure 12:
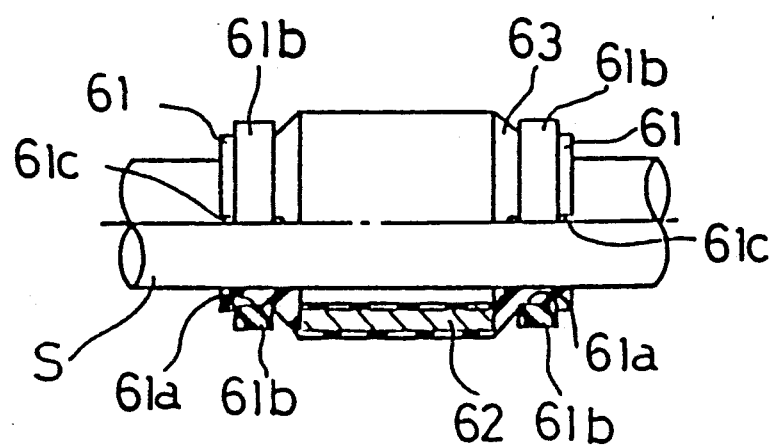
FIG. 12 is a front elevation view of the installed dynamic damper thereof, partially in section.

FIG. 10 is a cross-sectional view of the dynamic damper of the sixth preferred embodiment, taken on the line 10—10 of FIG. 11. FIG. 11 is a right side elevation view of the dynamic damper thereof. FIG. 12 is a front elevation view of the installed dynamic damper thereof, partially in section.

The dynamic damper 6 of this sixth preferred embodiment is employed for damping vibrations of automobile drive shafts. This dynamic damper 6 is press-fitted and installed around an automobile drive shaft, and especially suitable for an application to a drive shaft formed to have a shaft diameter at the shaft ends larger than a shaft diameter at the dynamic damper installation position.

The dynamic damper 6 of this preferred embodiment comprises: a pair of fixing members 61, 61 inserted into and supported by a drive shaft "S" as a rotary shaft at a predetermined interval, and the fixing members 61, 61 being in a ring shape and having two (2) slits 61c, 61c extending in the axial direction of the dynamic damper 6 and broadening their widths in the circumferential direction thereof; a mass member 62 having an inner surface greater than the outer surface of the drive shaft "S" and disposed between the pair of the fixing members 61, 61; and elastic members 63, 63 integrally connecting the ends of the fixing members 61, 61 and the ends of the mass member 62. The dynamic damper 6 has a cylinder-shaped overall configuration, in which the outer diameter of the intermediate portion is greater than the outer diameters of both of the end portions. Here, the mass member 62 corresponds to the intermediate portion, and the fixing members 61, 61 correspond to both of the end portions. The elastic members 63, 63 correspond to portions connecting the intermediate portion and both of the end portions in an inclining manner.

The fixing members 61, 61 are divided into two (2) component members by the slits 61c, 61c. The fixing members 61, 61 are formed in a ring shape, used in a pair, and formed of elastic material such as natural rubber and the like. The fixing members 61, 61 are integrally connected to the elastic members 63, 63 at one of the ends, whereby the ring-shaped configuration is retained. The diameter of the inner surface of the fixing member 61, constituting the central axis bore thereof, is slightly smaller than the diameter of the outer surface of the drive shaft "S". Further, a ring-shaped groove 61a is formed in the outer surface of the fixing member 61. The slits 61c, 61c are formed at portions symmetrical with each other with respect to the axis of the fixing member 61, and in the width of from 1 to 2 mm. The slits 61c, 61c extend from the end surface of the fixing member 61 and reach the elastic member 63 connected integrally thereto in the axial direction.

The mass member 62 is a cylinder-shaped mass body made of metal such as a thick-wall cylinder-shaped steel pipe, and the outer and inner surfaces are coated with elastic material such as natural rubber and the like by the thickness of approximately 1 mm. The mass member 62 is disposed around the outer circumference of the drive shaft "S". The inner surface of the mass member 62 has a diameter slightly larger than the portion of the drive shaft "S", having outer surface of the maximum diameter, to be inserted. The portion of the drive shaft "S" having outer surface of the maximum diameter corresponds to the pass for inserting the drive shaft "S". Accordingly, there is formed a clearance between the inner surface of the mass member 62 and the outer surface of the drive shaft "S" at the dynamic damper 6 installation position. The clearance is slightly larger than the difference between the shaft diameter dimensions. When the dynamic damper 6 is installed around the drive shaft "S" in the above-mentioned manner, the mass member 62 is supported by the elastic member 63, 63 in the shear direction.

The elastic members 63, 63 are formed in a hollow truncated cone, and formed of elastic material such as natural rubber and the like. The elastic members 63, 63 connect the fixing members 61, 61 and the mass member 62 integrally. The inner surface 63a of the elastic member 63 is formed in a tapered shape, namely the inner surface 63a of the elastic member 63 starts at the inner surface end of the fixing member 61 to be brought into close contact with the outer surface of the drive shaft "S", and reaches the inner surface end of the mass member 62 having a clearance set in accordance with the outer surface of the drive shaft "S" to be installed while gradually increasing the inner diameter thereof. The outer surface 63b of the elastic member 63 is formed also in a tapered shape, namely the outer surface 63b of the elastic member 63 starts at the end of the engaging groove 61a formed in the fixing member 61, and reaches the outer surface end of the mass member 62 while gradually increasing the outer diameter thereof.

In the above-mentioned arrangement, the fixing members 61, 61 are divided into two (2) component members by the slits 61c, 61c, but one of the ends of the fixing members 61, 61 are connected to the elastic members 63, 63, whereby the ring shape of the fixing members 61, 61 is integrally retained. In addition, when spreading the slits 61c, 61c in the circumferential direction, the elastic members 63, 63 support the restoring force of the fixing members 61, 61.

Both of the fixing members 61, 61, both of the elastic members 63, 63 and the rubber coating of the mass member 62 are formed integrally by vulcanization molding with a mold.

The dynamic damper 6 of this sixth preferred embodiment arranged as described above is used in the following manner. When installing the dynamic damper 6 around the drive shaft "S", the opening of the fixing member 61 of the dynamic damper 6 is placed on the shaft end of the drive shaft "S" before mounting the drive shaft "S" on an automobile body. Although the diameter of the inner surface of the fixing member 61 is made smaller than the outer diameter of the drive shaft "S", the diameter of the inner surface of the fixing member 61 can be enlarged easily by spreading the slits 61c, 61c formed in the fixing member 61 in the circumferential direction. The drive shaft "S" can be readily inserted into the fixing member 61 whose inner surface diameter has been thus enlarged. After disposing the dynamic damper 6 at a predetermined position of the drive shaft "S", the slits 61c, 61c of the fixing members 61, 61 are put back into the original state, and the engaging grooves 61a, 61a formed in the outer surface of the fixing members 61, 61 are fixed by the fixing bands 61b, 61b, whereby the dynamic damper 6 is installed around the drive shaft "S". Similarly, the dismounting of the dynamic damper 6 from the drive shaft "S" can be also done easily.

When the drive shaft "S" rotates and harmful vibrations are excited, the mass member 62 of the dynamic damper 6 resonates. The intrinsic frequency of the mass member 62 has been adjusted to the frequencies of the harmful vibrations, and the intrinsic frequency of the mass member 62 is basically determined by the mass of the mass member and the spring constants of the elastic members 63, 63 in the shear direction. When the intrinsic frequency should be set at lower values, the above-mentioned arrangement is advantageous because smaller spring constants are generally exhibited by the elastic members 63, 63 in the shear direction rather than in the compression/tensile direction during the resonance.

The dynamic damper 6 thus arranged can absorb the vibration energy of the drive shaft "S" and suppress the harmful vibrations excited in the drive shaft "S" by resonating the mass member 62 thereof.

The number of the slits 61c, 61c formed in the fixing members 61, 61 has been two (2) in the dynamic damper 6 of this preferred embodiment, however, the number is not specifically limited thereto as far as one or more of them are formed. Further, a plurality of projections for relieving shocks during the occurrence of excessive amplitudes may be formed on the inner surface of the mass member 62. Furthermore, the fixing belts 61b, 61b have been employed as the fixing means for fixing the fixing members 61, 61, however, it is apparent that other means such as bonding means is capable of fixing the fixing means 61, 61 around the drive shaft "S".

SEVENTH PREFERRED EMBODIMENT

A dynamic damper of a seventh preferred embodiment according to this invention will be hereinafter described with reference to FIGS. 13 to 15.

Figure 13:
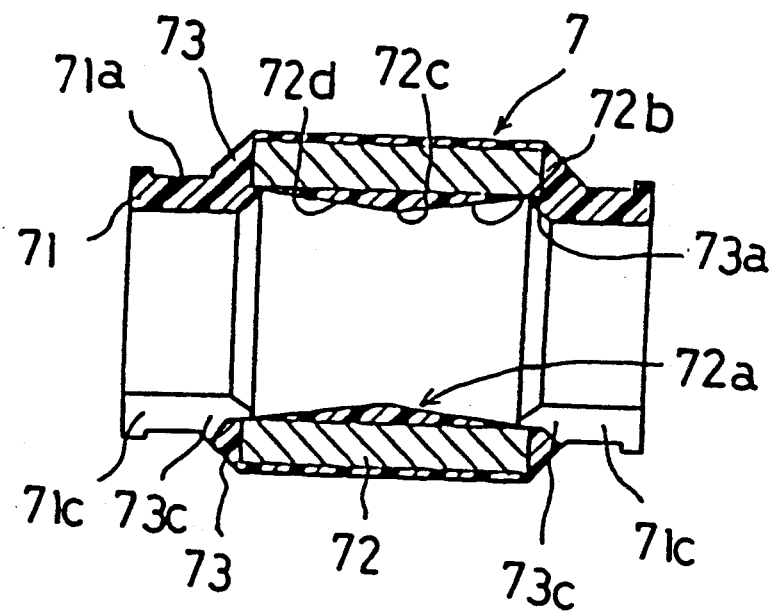
FIG. 13 is a cross-sectional view of a dynamic damper of a seventh preferred embodiment, taken on the line 13—13 of FIG. 14.
Figure 14:
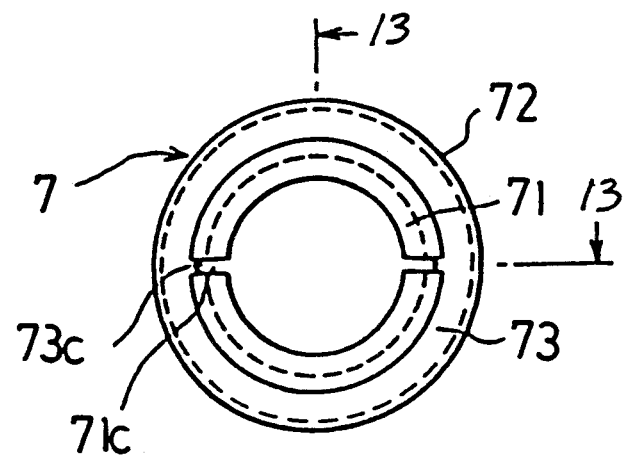
FIG. 14 is a right side elevation view of the dynamic damper thereof.
Figure 15:
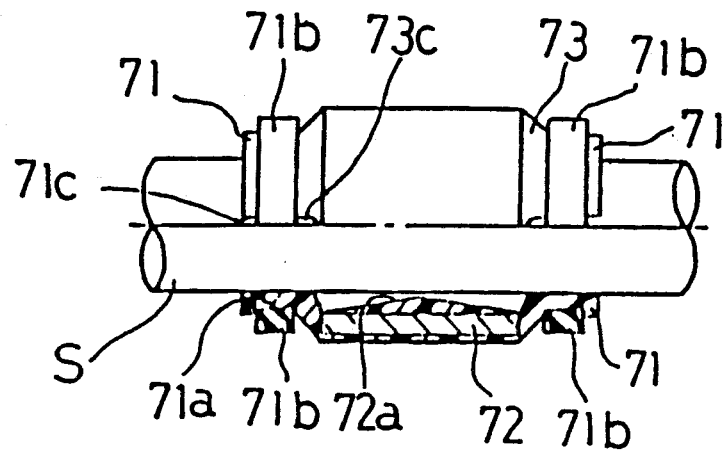
FIG. 15 is a front elevation view of the installed dynamic damper thereof, partially in section.

FIG. 13 is a cross-sectional view of the dynamic damper of the seventh preferred embodiment, taken on the line 13—13 of FIG. 14. FIG. 14 is a right side elevation view of the dynamic damper thereof. FIG. 15 is a front elevation view of the installed dynamic damper thereof, partially in section.

The dynamic damper 7 of this seventh preferred embodiment is employed for damping vibrations of automobile drive shafts.

The dynamic damper 7 of this preferred embodiment comprises: a pair of fixing members 71, 71 inserted into and supported by a drive shaft "S" as a rotary shaft at a predetermined interval, and the fixing members 71, 71 being in a ring shape and having two (2) slits 71c, 71c extending in the axial and radial directions of the dynamic damper 7; a mass member 72 having an inner surface greater than the outer surface of the drive shaft "S" and disposed between the pair of the fixing members 71, 71; and elastic members 73, 73 integrally connecting the ends of the fixing members 71, 71 and the ends of the mass member 72 and having two (2) slits 73c, 73c formed therein. The dynamic damper 7 has a cylinder-shaped overall configuration, in which the outer diameter of the intermediate portion is greater than the outer diameters of both of the end portions. Here, the mass member 72 corresponds to the intermediate portion, and the fixing members 71, 71 correspond to both of the end portions. The elastic members 73, 73 correspond to portions connecting the intermediate portion and both of the end portions in an inclining manner.

The fixing members 71, 71 are divided into two (2) component members by the slits 71c, 71c. The fixing members 71, 71 are formed in a ring shape as a whole, and used in a pair. The fixing members 71, 71 are formed of elastic material such as natural rubber and the like. One of the ends of the fixing members 71, 71 are integrally connected to the elastic members 73, 73. The diameter of the inner surface of the fixing member 61, constituting the central axis bore thereof, is slightly smaller than the diameter of the outer surface of the drive shaft "S" at the installation position, around which the dynamic damper 7 is installed. Further, a ring-shaped groove 71a is formed in the outer surface of the fixing members 71, 71 in a manner circling in the circumferential direction. The slits 71c, 71c are formed at portions axially symmetrical with each other, and in the width of from 1 to 2 mm. The slits 71c, 71c extend from the end surface of the fixing member 71 and respectively communicate with the slits 73c, 73c formed in the elastic member 73. The slits 71c, 71c and the slits 73c, 73c are formed integrally.

The mass member 72 is a cylinder-shaped mass body made of metal such as a thick-wall cylinder-shaped steel pipe, and the outer and inner surfaces are coated with elastic material such as natural rubber and the like. The mass member 72 is disposed around the outer circumference of the drive shaft "S" at predetermined spaces. The thickness of the coating on the outer surface of the mass member 72 is approximately 1 mm. The inner surface 72a of the mass member 72 comprises a fist inclining surface 72b and a second inclining surface 72d which are formed by varying the thickness of the elastic material coating. In the dynamic damper 7 of this preferred embodiment, the first inclining surface 72b and the second inclining surface 72d are formed in a symmetrical manner with respect to a central portion 72c in the axial direction of the inner surface 72a. The central portion 72c is in the closest proximity to the outer surface of the drive shaft "S". The first inclining surface 72b and the second inclining surface 72d are so formed to be inner surfaces having diameters increasing at a virtually constant rate starting at the central portion 72c toward the both ends of the mass member 72. At the both ends of the mass member 72, the first inclining surface 72b and the second inclining surface 72d are respectively connected to the ends of the elastic members 73, 73, and to the slits 73c, 73c formed at the ends. The ends of the first inclining surface 72b and the second inclining surface 72d is formed in a substantially circular shape having slightly increased diameter and communicating with the slits 73c, 73c, thereby enabling to smoothly expel the water, oil and the like. The ends of the mass member 72 is supported by the elastic members 73, 73 in the shear direction.

The elastic member 73, 73 are formed in a hollow truncated cone having two (2) slits 73c, 73c, and are formed of elastic material such as natural rubber and the like. The elastic members 73, 73 connect the fixing members 71, 71 and the mass member 72 integrally. The inner surface 73a of the elastic member 73 is formed in a tapered shape, namely the inner surfaces 73a, 73a of the elastic members 73, 73 start at the inner surface ends of the fixing members 71, 71 to be brought into close contact with the outer surface of the drive shaft "S", and reach the ends of the first inclining surface 72b and the second inclining surface 72d forming the inner surface 72a of the mass member 72 while gradually increasing the inner diameters thereof. The two (2) slits 73c, 73c formed in the elastic member 73 are disposed in an axially symmetrical manner with each other. These slits 73c, 73c communicate with the two (2) slits 71c, 71c formed in the fixing members 71, 71. The slits 73c, 73c and the slits 71c, 71c are formed integrally. The furthest end of each of the slits 73c, 73c reaches the ends of the first inclining surface 72b and the second inclining surface 72d, which are situated furthest away from the central axis of the rotation.

Both of the fixing members 71, 71, both of the elastic members 73, 73 and the rubber coating of the mass member 72 are formed integrally by vulcanization molding with a mold.

The dynamic damper 7 of this seventh preferred embodiment arranged as described above is used in the following manner. When installing the dynamic damper 7 around the drive shaft "S", the opening of the fixing member 71 of the dynamic damper 7 is placed on the shaft end of the drive shaft "S" before mounting the drive shaft "S" on an automobile body. Although the diameter of the inner surface of the fixing member 71 is made smaller than the outer diameter of the drive shaft "S", the diameter of the inner surface of the fixing member 71 can be enlarged easily by spreading two (2) slits 71c, 71c formed in the fixing member 71 in the circumferential direction. The drive shaft "S" can be readily inserted into the fixing member 71 whose inner surface diameter has been thus enlarged. After disposing the dynamic damper 7 at a predetermined position of the drive shaft "S", the engaging grooves 71a, 71a formed in the outer surface of the fixing members 71, 71 are fixed by the fixing bands 71b, 71b, whereby the dynamic damper 7 is installed around the drive shaft "S". Similarly, the dismounting of the dynamic damper 7 from the drive shaft "S" can be also done easily.

When the drive shaft "S" rotates and harmful vibrations are excited, the mass member 72 of the dynamic damper 7 resonates. The intrinsic frequency of the mass member 72 has been adjusted to the frequencies of the harmful vibrations, and the intrinsic frequency of the mass member 72 is basically determined by the mass of the mass member 72 and the spring constants of the elastic members 73, 73 in the shear direction. The dynamic damper 7 thus arranged can absorb the vibration energy of the drive shaft "S" and suppress the harmful vibrations excited in the drive shaft "S" by resonating the mass member 72 thereof.

When the dynamic damper 7 is in operation, the dynamic damper 7 installed around the drive shaft "S" is rotated by the rotation of the drive shaft "S", thereby generating centrifugal force. The centrifugal force moves the water, oil and the like accumulated in the dynamic damper 7 in the radial direction thereof. The water, oil and the like are consequently pressed against the inner surface 72a of the dynamic damper 7 and the inner surfaces 73a, 73a of the elastic members 73, 73. The first inclining surface 72b and the second inclining surface 72d are formed over the inner surface 72a of the mass member 72, and the inner surfaces 73a, 73a of the elastic members 73, 73 have an inclination toward the ends of the mass member 72. As a result, the water, oil and the like pressed against the inner surfaces 72a, 73a, 73a are pushed forward in the direction getting away from the central axis of the rotation along the inclining surfaces 72b, 72d, 73c and 73c. The water, oil and the like are then led to the slits 73c, 73c and 71c, 71c formed over the elastic members 73, 73 and the fixing members 71, 71, and expelled through the slits 73c, 73c and 71c, 71c to the outside. The water, oil and the like accumulated in the dynamic damper 7 has been thus expelled automatically by the centrifugal force resulting from the rotation, and the space formed between the drive shaft "S" and the mass member 72 in the dynamic damper 7 has been kept in a state free from the water, oil and the like.

In the dynamic damper 7 of the seventh preferred embodiment, the first inclining surface 72b and the second inclining surface 72d forming the inner surface 72a of the mass member 72 are disposed symmetrically with respect to the central portion 72c, but the disposition thereof is not limited to the symmetrical arrangement. The inclining surfaces 72b and 72d may be disposed in an offset manner with respect to the central portion 72c.

EIGHTH PREFERRED EMBODIMENT

A dynamic damper of an eighth preferred embodiment according to this invention will be hereinafter described with reference to FIG. 16.

Figure 16:
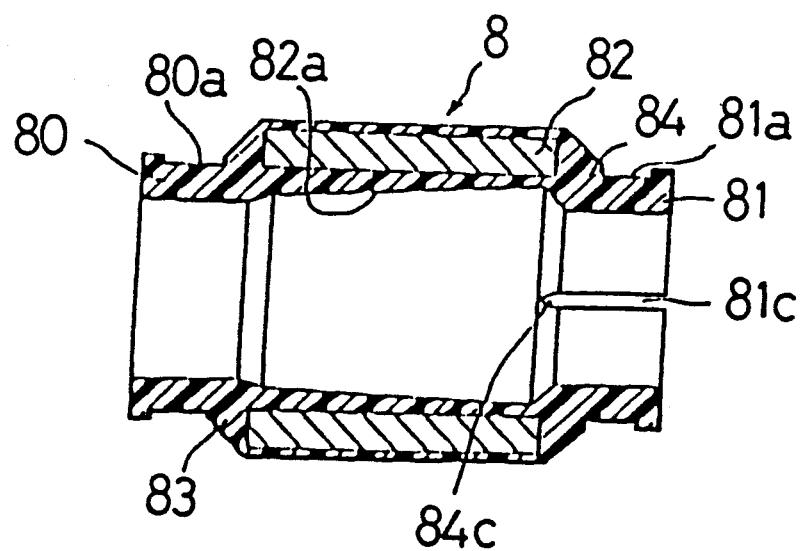
FIG. 16 is a vertical cross-sectional view of a dynamic damper of a sixth preferred embodiment, in which the dynamic damper is cut parallel to the axis thereof.

FIG. 16 is a vertical cross-sectional view of the dynamic damper of the sixth preferred embodiment, in which the dynamic damper is cut parallelly to the axis thereof.

The arrangements of the dynamic damper 8 of the eighth preferred embodiment will be hereinafter described, which differ greatly from those of the dynamic damper 7 of the seventh preferred embodiment. The dynamic damper 8 has a structure, thereby expelling the water, oil and the like accumulated in the dynamic damper 8 at one of the ends thereof. On the other hand, the dynamic damper 7 of the seventh preferred embodiment has the structure, thereby expelling the water, oil and the like accumulated in the dynamic damper 7 at the both ends thereof.

The dynamic damper 8 of the eighth preferred embodiment comprises: a first fixing member 80 inserted into and supported by a drive shaft "S"; a second fixing member 81 disposed at a predetermined interval from the first fixing member 80, inserted into and supported by the drive shaft "S" and having two (2) slits 81c, 81c; a mass member 82 having an inner surface greater than the outer surface of the drive shaft "S" and disposed between the first fixing member 80 and the second fixing member 81; a first elastic member 83 integrally connecting the ends of the first fixing member 80 and one end of the mass member 82; and a second elastic member 84 integrally connecting the end of the second fixing member 81 and the other end of the mass member 82 and having two (2) slits 84c, 84c formed therein, and the slits 84c, 84c are formed in a manner communicating with the slits 81c, 81c of the second fixing member 81.

The inner surface of the mass member 82 constitutes an inclining surface 82a having the smallest diameter at the end integrally connected to the first elastic member 83 and the largest diameter at the end integrally connected to the second elastic member 84. The inclining surface 82a increases its diameter at a virtually constant rate, and communicates with two (2) slits 84c, 84c, formed in the second elastic member 84, at the portion having the largest diameter and connected to the second elastic member 84. Further, the slits 84c, 84c communicates integrally with two (2) slits 81c, 81c of the second fixing member 81.

A first engaging groove 80a and a second engaging groove 81a are formed in the outer surface of the first fixing member 80 and the second fixing member 81, respectively. The first fixing member 80 and the second fixing member 81 are fixed by a fixing belt (not shown).

When the dynamic damper 8 installed around the drive shaft "S" rotates, the water, oil and the like accumulated therein are moved along the inclining surface 82a of the mass member 82 and collected at the portion connecting the mass member 82 and the second elastic member 84 by the centrifugal force. The water, oil and the like thus collected are then expelled through the slits 84c, 84c formed at the portion and through the slits 81c, 81c formed in the second fixing member 81 to the outside of the dynamic damper 8.

Other than the arrangements described above, the dynamic damper 8 of the eighth preferred embodiment has arrangements substantially similar to those of the dynamic damper 7 of the seventh preferred embodiment. When a dynamic damper has a mass member having an surface inclining in one direction as described in the dynamic damper 8 of the eighth preferred embodiment, the configurations of the mass member and the elastic members are designed in view of their balances in order not to impair the functions of the dynamic damper.

NINTH PREFERRED EMBODIMENT

A dynamic damper of a ninth preferred embodiment according to this invention will be hereinafter described with reference to FIGS. 17 to 18.

Figure 17:
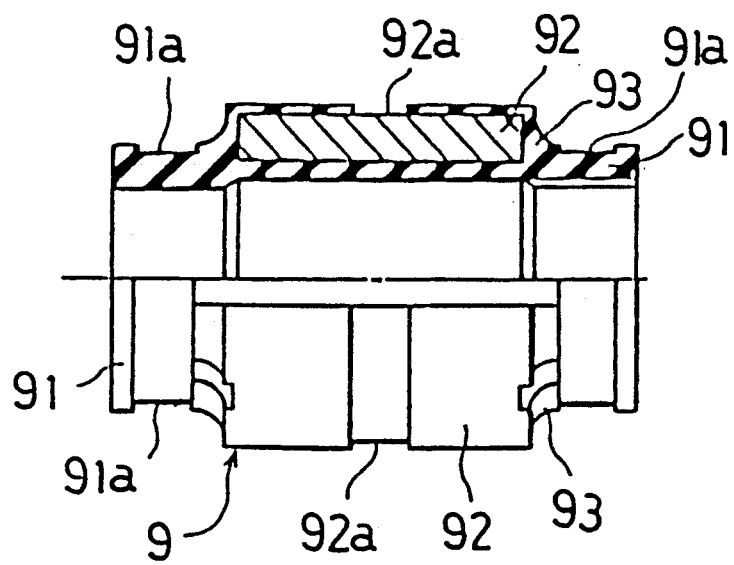
FIG. 17 is a front elevation view of a dynamic damper of a ninth preferred embodiment, in which half of the dynamic damper is cut away parallel to the axis thereof.
Figure 18:
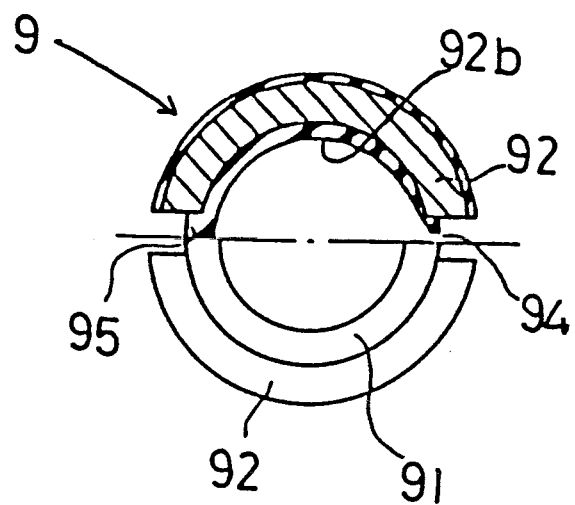
FIG. 18 is a right side elevation view of the dynamic damper thereof, partially in section.
Figure 19:
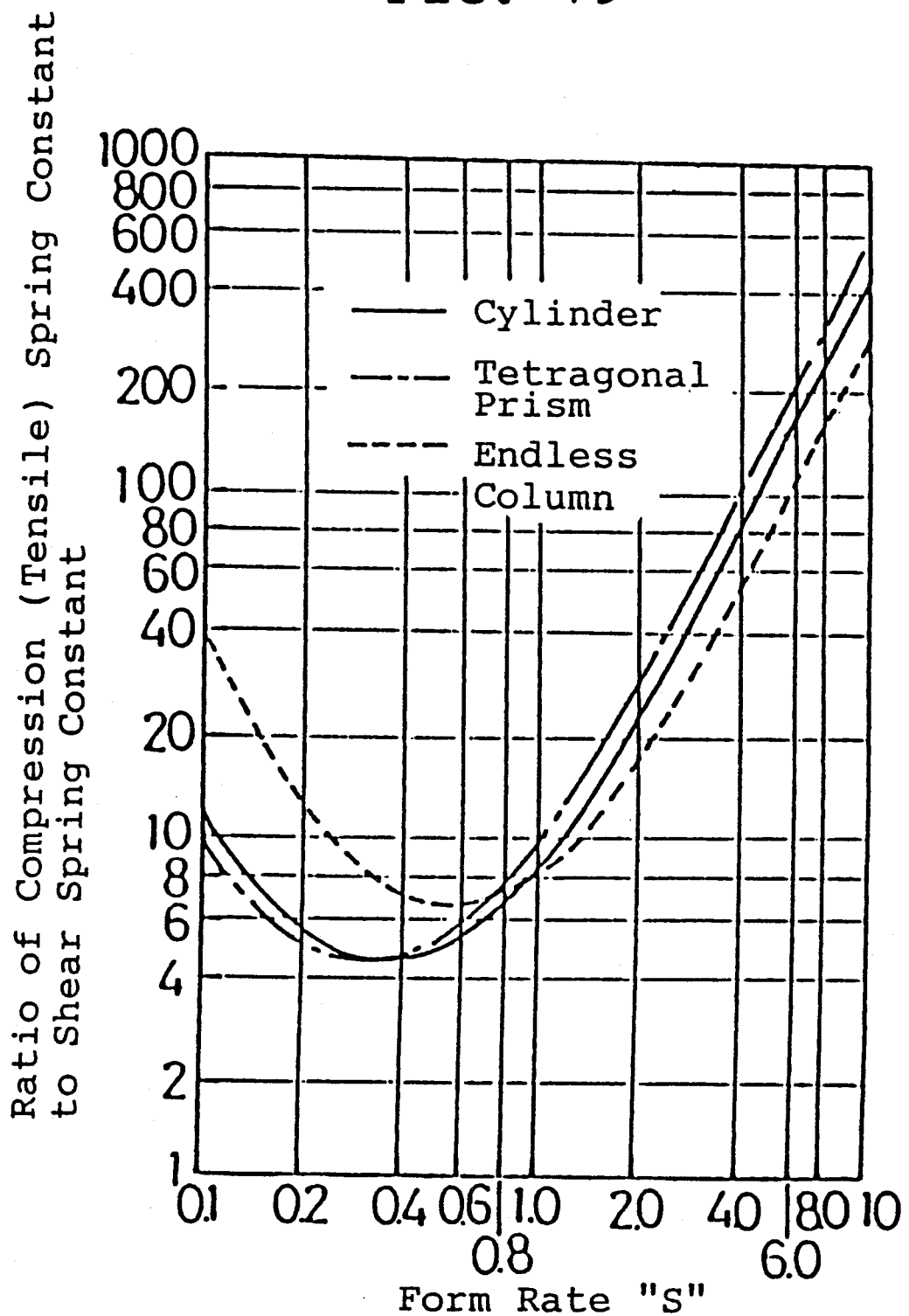
FIG. 19 is a diagram illustrating the relationships between the form rate "S" and the ratio of the compression (tensile) spring constant to the shear spring constant corresponding to the form rate "S"
Figure 20:
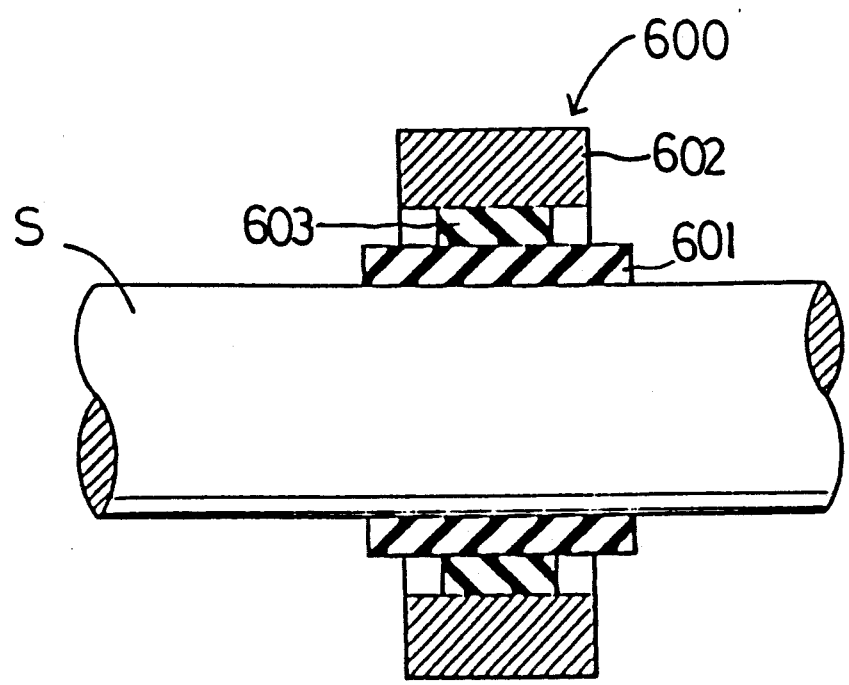
FIG. 20 is a schematic cross-sectional view of a conventional dynamic damper.

FIG. 17 is a front elevation view of the dynamic damper of the ninth preferred embodiment, in which half of the dynamic damper is cut away parallelly to the axis thereof. FIG. 18 is a right side elevation view of the dynamic damper thereof, partially in section.

The dynamic damper 9 of this ninth preferred embodiment comprises: a pair of fixing members 91, 91; a mass member 92; and elastic members 93, 93 integrally connecting the ends of the fixing members 91, 91 and the ends of the mass member 92. The dynamic damper 9 has a slit 94 extending parallelly to the axis thereof, and the cross section perpendicular to the axis thereof is formed in a letter "C" shape. The dynamic damper 9 further has a foldable folding portion 95 disposed at a position symmetrical to the slit 94 with respect to the axis thereof and extending parallelly to the axis thereof. The mass member 92 forming part of the folding portion 95 is divided into component members divided in the circumferential direction, disposed at predetermined spaces, and extending in the axial direction thereof.

The inner surface of the mass member 92 constitutes an inclining surface 92b. The inclining surface 92b is so formed that the portion thereof communicating with the slit 94 is made furthest away from the center axis of rotation, and the inner diameter thereof gradually increases in the circumferential direction as it starts from the folding portion 95 and approaches the slit 94. Accordingly, the water, oil and the like accumulated in the dynamic damper 9 are pressed against the inner surface of the mass member 92 forming the inclining surface 92b by the centrifugal force resulting from the rotation of the dynamic damper 9. The water, oil and the like are then moved along the inclining surface 92b in the circumferential direction, and finally expelled through the slit 94 to the outside of the dynamic damper 9.

Ring-shaped engaging grooves 91a, 91a are formed in the outer surface of the fixing members 91, 91, and ring-shaped engaging groove 92a is also formed in the outer surface of the mass member 92. Around these engaging grooves 91a, 91a, and 92a, fixing bands (not shown) are installed to fix the dynamic damper 9 around the drive shaft "S" and to close and connect the slit 94.

In the dynamic damper 9 of the ninth preferred embodiment, the folding portion 95 is disposed at an axially symmetrical position to the slit 94, but the disposition is not limited thereto.

Other than the arrangements described above, the dynamic damper 9 of the ninth preferred embodiment has arrangements substantially similar to those of the dynamic damper 7 of the seventh preferred embodiment. However, in the dynamic damper 9 of the ninth preferred embodiment, the component members are adapted to predetermined specifications in view of their rotation balances.

Having now fully described the invention, it will be apparent to one of ordinary skill in the art that many changes and modifications can be made thereto without departing from the spirit or scope of the invention as set forth herein.

What is claimed is:

1. A dynamic damper comprising:
    a pair of ring-shaped fixing members spaced from each other by a predetermined distance, inserted onto and supported by a rotary shaft having vibrations to be absorbed;
    a cylinder-shaped mass member having an inner surface larger than the outer surface of said rotary shaft, said cylinder-shaped mass member inserted onto and spaced away from said rotary shaft and disposed between said pair of ring-shaped fixing members; and
    elastic members integrally connecting ends of said fixing members with ends of said cylinder-shaped mass member, said mass member being free of support except from said elastic members whereby said mass member vibrates by resonance and said elastic members are subjected to shear deformation between said mass member and said rotary shaft.

2. A dynamic damper according to claim 1, wherein said fixing members have at least one slit extending in the axial direction thereof and broadening its width in the circumferential direction thereof, and are in a ring-shaped form.

3. A dynamic damper according to claim 1, wherein said fixing members have a ring-shaped engaging groove on the outer surface thereof.

4. A dynamic damper according to claim 3, wherein an engaging band is installed around said ring-shaped engaging groove of said fixing members, and said fixing members are fixed around said rotary shaft by the tightening force of said engaging band.

5. A dynamic damper according to claim 1, wherein said fixing members, mass member and elastic members have at least one slit extending parallel to the axis thereof, and said fixing members and mass member have a connecting means for connecting said slit.

6. A dynamic damper according to claim 1, comprising:
    a pair of ring-shaped fixing members disposed at a predetermined interval, inserted onto and supported by a rotary shaft;
    a cylinder-shaped mass member having an inner surface larger than the outer surface of said rotary shaft, said cylinder-shaped mass member inserted onto said rotary shaft and disposed between said pair of ring-shaped fixing members;
    wherein at least part of said inner surface of said mass member is in a form of an inclining surface sloping away from the central axis of rotation thereof, and said dynamic damper has at least one slit at the furthest portion from said central axis of rotation thereof, said at least one slit extending from said inclining surface to the outside of said dynamic damper; and
    elastic members integrally connecting the ends of said fixing members with the ends of said cylinder-shaped mass member.

7. A dynamic damper according to claim 1, wherein said fixing members and said elastic members are integrally formed of elastic material.

8. A dynamic damper according to claim 7, wherein said mass member constitutes an insert and is molded integrally with said fixing members and said elastic members.

* * * * *